United States Patent [19]

Iwabuchi et al.

[11] Patent Number: 5,605,561
[45] Date of Patent: Feb. 25, 1997

[54] TANTALUM POWDER AND ELECTROLYTIC CAPACITOR USING SAME

[75] Inventors: Katsuo Iwabuchi; Tadashi Komeya; Hiroshi Oki, all of Omiyamachi, Japan; Dieter Behrens, Goslar, Germany

[73] Assignee: Starck Vtech Ltd., Tokyo, Japan

[21] Appl. No.: 523,965

[22] Filed: Sep. 6, 1995

[30] Foreign Application Priority Data

Sep. 28, 1994 [JP] Japan .................................. 6-233307

[51] Int. Cl.$^6$ ................................................ B22F 9/20
[52] U.S. Cl. ............................ 75/364; 75/365; 75/369; 75/255; 204/292; 361/529; 420/427
[58] Field of Search ............................ 75/363, 364, 365, 75/369, 370, 255; 420/427; 204/292; 361/529

[56] References Cited

U.S. PATENT DOCUMENTS

| | | | |
|---|---|---|---|
| 4,041,359 | 8/1977 | Mizushima et al. | 361/529 |
| 4,356,028 | 10/1982 | Bates | 75/364 |
| 4,483,819 | 11/1984 | Albrecht et al. | 75/364 |
| 4,645,533 | 2/1987 | Izumi | 420/427 |
| 4,954,169 | 9/1990 | Behrens | 75/364 |
| 5,082,491 | 1/1992 | Rerat | 420/427 |
| 5,442,978 | 8/1995 | Hildreth et al. | 75/363 |
| 5,448,447 | 9/1995 | Chang | 361/529 |

FOREIGN PATENT DOCUMENTS 3130392  2/1983  Germany .

*Primary Examiner*—George Wyszomierski
*Attorney, Agent, or Firm*—Oblon, Spivak, McClelland, Maier & Neustadt, P.C.

[57] ABSTRACT

Tantalum powder obtained by adding magnesium powder to tantalum powder which is prepared by reducing potassium tantalum fluoride with sodium metal, without conventional heat-treatment for agglomeration, to remove oxygen present in the tantalum powder, then washing with an acid and drying; an anode body for electrolytic capacitors produced by sintering the tantalum powder; and, an electrolytic capacitor which comprises the anode body incorporated therein. The tantalum powder has a large specific surface area and accordingly, the electrolytic capacitor in which the anode body produced from the tantalum powder is incorporated has an extra high capacity, i.e., a CV ranging from 70000 to 80000. The probability of causing ignition during the production process is substantially reduced and thus the tantalum powder can be handled with safety.

4 Claims, No Drawings

TANTALUM POWDER AND ELECTROLYTIC CAPACITOR USING SAME

BACKGROUND OF THE INVENTION

The present invention relates to tantalum powder useful as a material for electrolytic capacitors, an anode body for electrolytic capacitors which is prepared by sintering the tantalum powder and an electrolytic capacitor in which the anode body is incorporated.

Tantalum has been used as an electrode material for capacitor because of a high dielectric constant, on the order of about 27, of the oxidized film thereof, but there has recently been desired for the development of an electrolytic capacitor having an improved capacity for the reasons of competition with other capacitors and a general tendency toward miniaturization of electric and electronic apparatuses and correspondingly, there has rapidly increased a need for tantalum powder as such an electrode material.

Tantalum powder is in general prepared by reducing potassium tantalum fluoride with sodium. The spault-like tantalum powder thus prepared includes salts as by-products and accordingly, the tantalum powder is subjected to a treatment such as water-washing and/or acid-washing to remove the salts present therein and to thus improve the purity thereof and then dried to give raw powder. The tantalum powder prepared through reduction with sodium metal is not easily handled since it comprises fine particles having an average particle size on the order of 0.3 to 3.0 μm. For this reason, tantalum powder containing fine particles is heat-treated in a vacuum to once agglomerate the powder, followed by disintegrating the agglomerate into porous particles having a particle size ranging from 1.0 to 5.0 μm and a large specific surface area prior to the practical use thereof.

As has been discussed above, tantalum powder (raw powder) is heat-treated in a vacuum to remove any gaseous components (hydrogen gas) and metallic impurities (such as sodium and potassium) and to granulate the fine particles and improve the flowability of the powder. Incidentally, the content of oxygen present in the tantalum raw powder having an average particle size ranging from 0.3 to 0.4 μm ranges from about 7000 to 9000 ppm, but the content thereof is increased up to a level ranging from 12000 to 14000 ppm due to the heat-treatment in a vacuum. The presence of oxygen increases the leakage current of the powder which is an important electrical property. For this reason, most of the tantalum powder products are subjected to removal of oxygen through reduction with, for instance, magnesium metal to improve the leakage current, followed by acid-washing and drying processes prior to the practical use thereof in the electrode-production.

The electrostatic capacity (C) can be expressed by the following relation:

$$\text{Electrostatic Capacity } C = \text{Dielectric Constant } (\epsilon) \times \text{Specific Surface Area } (S) \div \text{Film Thickness } (d)$$

Therefore, tantalum powder to be developed and used as an electrode material for electrolytic capacitors having an extra high capacity must have a specific surface area as large as possible. For instance, it is necessary, for the development of such tantalum powder, to prepare raw powder having a large specific surface area through reduction with sodium; to prepare raw powder whose impurity content is reduced to a lowest possible level so as to cope with the requirement for the pellet-sintering temperature which has recently been inclined to be reduced; and to select the optimum temperature for the heat-treatment so that the heat-treatment is not accompanied by a substantial reduction in the specific surface area of the raw powder.

However, when preparing tantalum powder having a large specific surface area and used as an electrode material for electrolytic capacitors having an extra high capacity according to a conventional method, the following problems arise.

① Fine tantalum particles having a large specific surface area and prepared by reduction with sodium metal are significantly sensitive to heat and have high activities. For this reason, the particles partially undergo granulation at a considerably low temperature for the heat-treatment on the order of 1200° to 1300° C. This granulation leads to a decrease in the specific surface area of the particles and makes the production of a capacitor having a high capacity difficult.

② The decrease in the specific surface area may be inhibited by reducing the temperature of the heat-treatment, but the degree of oxygen-pickup is increased when removing the product from a heat-treating furnace after finishing the heat-treatment in proportion to the reduction in the temperature of the heat-treatment and the risk of ignition correspondingly increases.

③ Moreover, a scattering (±15° C.) in the temperature is observed within the furnace for the heat-treatment and accordingly, there are likewise observed scatterings in physical properties (such as specific surface area, bulk, particle size distribution) and electrical properties (such as CV).

④ The ingredient must be heat-treated little by little for preventing any ignition (for reducing the quantity of accumulated heat). In addition, it is necessary to remove the product from the furnace after completion of the heat-treatment while stepwise bringing it into contact with oxygen (several steps) and, for this reason, the productivity rate thereof is substantially impaired.

SUMMARY OF THE INVENTION

Accordingly, an object of the present invention is to provide tantalum powder which is prepared through reduction with sodium, has a large specific surface area and is useful as a material for preparing an electrolytic capacitor; an anode body for electrolytic capacitors, which is prepared by sintering the tantalum powder; and an electrolytic capacitor in which the anode body is incorporated.

Another object of the present invention is to provide a method for preparing sodium-reduced tantalum powder having a large specific surface area in a high productivity rate without being accompanied by any risk of ignition.

The present invention relates to tantalum powder obtained by adding magnesium powder to tantalum powder prepared by reducing potassium tantalum fluoride with sodium metal, without conventional heat-treatment for agglomeration, to remove oxygen present in the tantalum powder, then washing with an acid and drying. In short, the present invention is characterized in that tantalum powder for producing a capacitor having an extra high capacity is prepared by a process which does not include any process for heat-treatment which has conventionally been used as a granulation process.

DESCRIPTION OF THE PREFERRED EMBODIMENTS

The raw powder used in the present invention is tantalum powder prepared by reduction of potassium tantalum fluoride with metal sodium. The raw powder has an average particle size ranging from about 0.3 to 0.4 μm. In general, the raw powder is preferably doped with phosphorus through a treatment with phosphoric acid in order to suppress the occurrence of any granulation. The dose of the doped phosphorus suitably ranges from about 50 to 100 ppm. Then the raw powder is reduced with magnesium without subjecting it to any heat-treatment for agglomeration. Magnesium powder is added to the raw powder during the reduction in an amount ranging from about 2.0 to 6.0% by weight. The raw powder is thus mixed with magnesium powder and it is thus reduced at a temperature ranging from 950° to 1050° C., preferably 980° to 1020° C., for 2 to 6 hours, preferably 3 to 4 hours in a vacuum. If the temperature is less than 950° C., the raw powder is not sufficiently reduced (oxygen removal). On the other hand, if it exceeds 1050° C., the raw powder undergoes granulation and accordingly, the resulting tantalum powder has only a low specific surface area.

After the oxygen present in the raw powder is thus removed, the raw powder is washed with an acid such as nitric acid and then dried. The foregoing processes, i.e., the magnesium-reduction, acid-washing and drying processes are, if necessary, repeated two times or more till tantalum powder having desired properties is obtained.

Any heat-treatment for agglomeration is omitted in the present invention. Therefore, the problem of oxygen-pickup observed during the heat-treatment can be solved and the probability of, for instance; ignition is quite low. Accordingly, the tantalum powder of the present invention can easily be handled and ensures a high productivity rate. Moreover, the treatment with magnesium for reducing the oxygen content is accompanied by the progress of granulation, but the reduction in the specific surface area is low as compared with the conventional methods. Thus, the tantalum powder of the present invention has excellent characteristic properties suitable for use as a material for the production of a capacitor having an extra high capacity.

EXAMPLE

Tantalum powder reduced with sodium (average particle size 0.31, 0.34 or 0.37 μm) was doped with phosphorus to a dose of 80 ppm through a treatment with phosphoric acid to give raw powder. Then 5% by weight of magnesium powder was added to and mixed with the raw powder and subjected to a treatment for oxygen removal at a temperature listed in the following Table 1 for 3 hours. Then the raw powder was washed with a nitric acid aqueous solution and dried. Thereafter, 2% by weight of magnesium powder was added to and mixed with the raw powder and subjected to a secondary treatment for oxygen removal at the same temperature used above for 3 hours. Then the raw powder was washed with a nitric acid aqueous solution and dried to give a final product. The resulting powder was sintered at 1350° C. for 30 minutes to give an anode body having a pelletting density of 5.0 g/cc and the resulting anode body was inspected for physical properties and electrical properties. The results thus obtained are listed in Table 1.

COMPARATIVE EXAMPLE

Tantalum powder reduced with sodium (average particle size 0.31 or 0.34 μm) was doped with phosphorus to a dose of 80 ppm through a treatment with phosphoric acid to give raw powder, as in Example 1. The resulting raw powder was subjected to the usual heat-treatments (at 1200° C. for 30 minutes; and at 1240° C. for 30 minutes) and then 5% by weight of magnesium powder was added to and mixed with the raw powder and subjected to a treatment for oxygen removal at 960° C. for 3 hours. Then the raw powder was washed with a nitric acid aqueous solution and dried. Thereafter, 2.5% by weight of magnesium powder was added to and mixed with the raw powder and subjected to a secondary treatment for oxygen removal at the same temperature used above for 3 hours. Then the raw powder was washed with a nitric acid aqueous solution and dried to give a final product. The results obtained in this conventional method are also listed in Table 1.

Conditions for Pelletting-Sintering-Formation of Anode Body and Conditions for Property-Measurement Pellet Weight: 0.15 g; pellet green density: 5.0 g/cc Sintering: at 1350° C. for 30 minutes Formation: 60° C.; Formation Voltage: 40 V

TABLE 1

| Ex. No. | Na-Reduced Powder | | Temperature for Heat-Treatment (°C.) | Mg-Reduction Temperature | |
|---|---|---|---|---|---|
| | Average Particle Size (μ) | Specific Surface Area (m²/g) | | (1) (°C.) | (2) (°C.) |
| 1 | 0.31 | 2.715 | — | 1000 | 1000 |
| 2 | 0.31 | 2.715 | — | 900 | 1000 |
| 3 | 0.31 | 2.715 | — | 900 | 900 |
| 4 | 0.34 | 2.373 | — | 1000 | 1000 |
| 5 | 0.34 | 2.373 | — | 900 | 1000 |
| 6 | 0.34 | 2.373 | — | 900 | 900 |
| 7 | 0.34 | 2.373 | — | 1050 | 1050 |
| 8 | 0.37 | 2.260 | — | 1050 | 1050 |
| 9 | 0.37 | 2.260 | — | 1000 | 1000 |
| 10 | 0.37 | 2.260 | — | 900 | 1000 |
| 11 | 0.37 | 2.260 | — | 900 | 900 |
| 1* | 0.31 | 2.715 | 1200 | 960 | 960 |
| 2* | 0.31 | 2.715 | 1240 | 960 | 960 |
| 3* | 0.34 | 2.373 | 1200 | 960 | 960 |
| 4* | 0.34 | 2.373 | 1240 | 960 | 960 |

| Ex. No. | Product | | | |
|---|---|---|---|---|
| | Specific Surface Area (m²/g) | Oxygen (ppm) | CV (μFV/g) | SD (g/cc) |
| 1 | 1.157 | 4084 | 81306 | 5.50 |
| 2 | 1.264 | 4374 | 85708 | 5.27 |
| 3 | 1.731 | 6283 | 86371 | 6.05 |
| 4 | 1.005 | 3514 | 77147 | 5.23 |
| 5 | 1.295 | 4570 | 86445 | 5.33 |
| 6 | 1.821 | 6421 | 91810 | 5.84 |
| 7 | 0.864 | 3216 | 67592 | 5.01 |
| 8 | 0.792 | 3089 | 66780 | 4.92 |
| 9 | 0.979 | 3555 | 77520 | 5.16 |
| 10 | 1.247 | 4172 | 83469 | 5.36 |
| 11 | 1.584 | 5857 | 68188 | 5.85 |
| 1* | 0.691 | 2677 | 59397 | 5.55 |
| 2* | 0.712 | 2741 | 56247 | 6.22 |
| 3* | 0.684 | 2560 | 56550 | 5.61 |
| 4* | 0.674 | 2619 | 52801 | 6.16 |

*Comparative Example

The tantalum powder of the present invention has a large specific surface area and accordingly, the electrolytic capacitor in which the anode body produced from the tantalum powder is incorporated has an extra high capacity, i.e., a CV ranging from 70000 to 80000. Moreover, the probability of causing ignition during the production process is substantially reduced in the present invention and thus the tantalum powder of the invention can be handled with safety.

What is claimed is:

1. Powdered tantalum which is prepared by:

reducing potassium tantalum fluoride with sodium metal thereby obtaining powdered tantalum:

reacting the powdered tantalum without a prior heat treatment which agglomerates the tantalum metal, with powdered magnesium to remove oxygen present in the tantalum powder; and washing the magnesium treated tantalum powder with acid and drying the washed powder, thereby producing said powdered tantalum having a capacitance of at least about 66,000 μFV/g.

2. An anode body for electrolytic capacitors produced by sintering the tantalum powder of claim 1.

3. An electrolytic capacitor which comprises the anode body of claim 2 incorporated therein.

4. A process for the production of powdered tantalum, which comprises the steps of:

reducing potassium tantalum fluoride with sodium metal thereby obtaining powdered tantalum:

reacting the powdered tantalum without a prior heat treatment which agglomerates the tantalum metal, with powdered magnesium to remove oxygen present in the tantalum powder; and washing the magnesium treated tantalum powder with acid and drying the washed powder, thereby producing said powdered tantalum having a capacitance of at least about 66,000 μFV/g.

* * * * *